US00RE49754E

(19) United States
(12) Reissued Patent
Yoo et al.

(10) Patent Number: US RE49,754 E
(45) Date of Reissued Patent: Dec. 12, 2023

(54) REFRIGERATOR

(71) Applicant: LG ELECTRONICS INC., Seoul (KR)

(72) Inventors: Myung Keun Yoo, Seoul (KR); Yong Hwan Eom, Seoul (KR); Ok Sun Yu, Seoul (KR); Hyoun Jeong Shin, Seoul (KR)

(73) Assignee: LG Electronics Inc., Seoul (KR)

(21) Appl. No.: 17/207,397

(22) Filed: Mar. 19, 2021

Related U.S. Patent Documents

Reissue of:
(64) Patent No.: 8,074,468
Issued: Dec. 13, 2011
Appl. No.: 12/390,520
Filed: Feb. 23, 2009

U.S. Applications:
(63) Continuation-in-part of application No. PCT/KR2008/001695, filed on Mar. 26, 2008.

(51) Int. Cl.
*F25D 11/00* (2006.01)
*F25D 23/02* (2006.01)

(52) U.S. Cl.
CPC ..... *F25D 23/021* (2013.01)

(58) Field of Classification Search
CPC ..... F25D 23/021; F25D 2323/01
See application file for complete search history.

(56) References Cited

U.S. PATENT DOCUMENTS 5,280,227 A * 1/1994 Bashark ..... 318/751
5,392,951 A 2/1995 Gardner et al.
5,445,294 A 8/1995 Gardner et al.
5,899,083 A * 5/1999 Peterson et al. ..... 62/186
5,940,306 A 8/1999 Gardner et al.
6,130,621 A 10/2000 Weiss
6,779,855 B2 8/2004 Hoffman
7,063,398 B2 6/2006 Hoffman
7,282,884 B2 10/2007 Huber et al.
7,407,210 B2 * 8/2008 Arbaugh et al. ..... 296/24.34
7,430,937 B2 * 10/2008 Rotter ..... F25D 25/025 62/302

(Continued)

FOREIGN PATENT DOCUMENTS

EP 0779484 6/1997
EP 1836930 3/2007

(Continued)

OTHER PUBLICATIONS

Translation of JP 07-174459 to Satoshi et al.

(Continued)

*Primary Examiner* — Beverly M Flanagan
(74) *Attorney, Agent, or Firm* — Fish & Richardson P.C.

(57) ABSTRACT

A movement structure for a drawer of a refrigerator is provided that allows a storage box to be automatically withdrawn from or inserted into a main body of the refrigerator. The structure may include a rolling mechanism that rolls along a guide mechanism coupled to the storage box to facilitate and guide the movement of the storage box and maintain alignment relative to the main body of the refrigerator. A drive motor may provide a rotational force to the rolling mechanism to automate the movement of the storage box.

42 Claims, 8 Drawing Sheets

AMENDED

(56) References Cited

U.S. PATENT DOCUMENTS

| | | | | |
|---|---|---|---|---|
| 7,484,817 | B2 | 2/2009 | Hoffman et al. | |
| 7,533,947 | B2 * | 5/2009 | Kim et al. | 312/402 |
| 7,587,907 | B2 * | 9/2009 | Kim et al. | 62/186 |
| 7,594,707 | B2 * | 9/2009 | Kunkle et al. | 312/402 |
| 7,602,135 | B2 | 10/2009 | Huber et al. | |
| 7,641,707 | B2 * | 1/2010 | Kang et al. | 55/385.1 |
| 7,688,015 | B2 | 3/2010 | Wenzel et al. | |
| 7,731,314 | B2 * | 6/2010 | Kim | 312/402 |
| 7,784,888 | B2 * | 8/2010 | Oh et al. | 312/223.6 |
| 7,802,515 | B2 * | 9/2010 | Suetsugu | 99/344 |
| 7,812,561 | B2 | 10/2010 | Hagen et al. | |
| 2002/0171335 | A1 * | 11/2002 | Held | 312/223.6 |
| 2004/0035129 | A1 * | 2/2004 | Kaiser | 62/302 |
| 2004/0100165 | A1 | 5/2004 | Hoffman | |
| 2004/0100166 | A1 | 5/2004 | Hoffman | |
| 2004/0100169 | A1 | 5/2004 | Huber et al. | |
| 2005/0284113 | A1 * | 12/2005 | Jang et al. | 55/385.1 |
| 2006/0061245 | A1 | 3/2006 | Huber et al. | |
| 2006/0087207 | A1 * | 4/2006 | Oh et al. | 312/402 |
| 2006/0087208 | A1 * | 4/2006 | Oh et al. | 312/402 |
| 2006/0096304 | A1 | 5/2006 | Kim et al. | |
| 2006/0104756 | A1 | 5/2006 | Kim et al. | |
| 2006/0196198 | A1 | 9/2006 | Kim et al. | |
| 2006/0207283 | A1 * | 9/2006 | Kim et al. | 62/407 |
| 2006/0226749 | A1 * | 10/2006 | Kim | 312/404 |
| 2006/0242988 | A1 * | 11/2006 | Kim et al. | 62/441 |
| 2006/0261775 | A1 | 11/2006 | Huber et al. | |
| 2006/0267461 | A1 | 11/2006 | Hoffman | |
| 2007/0013274 | A1 | 1/2007 | Hoffman | |
| 2007/0170828 | A1 | 7/2007 | Hoshide et al. | |
| 2007/0256036 | A1 | 11/2007 | Johnson et al. | |
| 2008/0018215 | A1 * | 1/2008 | Carden et al. | 312/404 |
| 2008/0116777 | A1 | 5/2008 | Kappler et al. | |
| 2008/0163639 | A1 * | 7/2008 | Hwang | 62/344 |
| 2008/0191591 | A1 | 8/2008 | Blucher | |
| 2008/0302114 | A1 * | 12/2008 | Kelly et al. | 62/170 |
| 2009/0091223 | A1 | 4/2009 | Hagen et al. | |
| 2009/0102338 | A1 | 4/2009 | Wenzel et al. | |
| 2009/0160297 | A1 * | 6/2009 | Anikhindi et al. | 312/319.7 |
| 2009/0199484 | A1 | 8/2009 | Zipp | |
| 2009/0206715 | A1 | 8/2009 | Scheffknecht et al. | |
| 2009/0243454 | A1 | 10/2009 | Yoo et al. | F25D 25/025 312/405.1 |
| 2009/0248205 | A1 | 10/2009 | Yu et al. | |
| 2009/0248207 | A1 | 10/2009 | Yoo et al. | A47B 88/457 62/449 |
| 2009/0254221 | A1 | 10/2009 | Kang | |

FOREIGN PATENT DOCUMENTS

| | | |
|---|---|---|
| JP | 1990-103388 | 4/1990 |
| JP | 1990-106686 | 4/1990 |
| JP | 1990-136686 | 5/1990 |
| JP | 1990-146487 | 6/1990 |
| JP | 1990-146487 | 9/1990 |
| JP | 1991-045820 | 2/1991 |
| JP | 07-174459 | 7/1995 |
| JP | 1995-174459 | 7/1995 |
| JP | 1999-094455 | 4/1999 |
| JP | 2005-026044 | 11/2005 |
| JP | 2005-326044 | 11/2005 |
| JP | 2006-023039 | 1/2006 |
| JP | 2006-046741 | 2/2006 |
| JP | 2006-046748 | 2/2006 |
| JP | 2006-145055 | 6/2006 |
| JP | 2006-250485 | 9/2006 |
| JP | 2007-017018 | 1/2007 |
| JP | 2007-093208 | 4/2007 |
| JP | 2007-132605 | 5/2007 |
| JP | 2008-8550 | 1/2008 |
| JP | 2008-196744 | 8/2008 |
| JP | 2008-196752 | 8/2008 |
| JP | 2009-036433 | 2/2009 |
| KR | 1999-003684 | 1/1999 |
| KR | 20-0301747 | 1/2003 |
| KR | 20-0334077 | 11/2003 |
| KR | 2006-0025806 | 3/2006 |
| KR | 10-0634366 | 10/2006 |
| KR | 2007/008046 | 1/2008 |
| WO | 2007/009783 | 1/2007 |

OTHER PUBLICATIONS

Translatio of JP 07-174459 to Satoshi et al.*
International Search Report dated Dec. 8, 2008.
International Search Report dated Dec. 3, 2008.
International Search Report issued in PCT Application No. PCT/KR2010/001496 dated Oct. 22, 2010.
International Search Report issued in PCT Application No. PCT/KR2010/001495 dated Oct. 25, 2010.
International Search Report issued in PCT Application No. PCT/KR2010/001409 dated Oct. 25, 2010.
International Search Report issued in PCT Application No. PCT/KR2010/001410 dated Oct. 25, 2010.
International Search Report dated Oct. 22, 2010 (Application No. PCT/KR2010/001497).
U.S. Office Action issued in U.S. Appl. No. 12/345,946 dated May 19, 2011.
U.S. Office Action issued in U.S. Appl. No. 12/345,984 dated May 23, 2011.
U.S. Office Action issued in U.S. Appl. No. 12/390,524 dated Aug. 25, 2011.
U.S. Office Action issued in U.S. Appl. No. 12/345,946 dated Sep. 26, 2011.
U.S. Office Action issued in U.S. Appl. No. 12/345,984 dated Sep. 26, 2011.

* cited by examiner

AMENDED

AMENDED

AMENDED

REFRIGERATOR

Matter enclosed in heavy brackets [ ] appears in the original patent but forms no part of this reissue specification; matter printed in italics indicates the additions made by reissue; a claim printed with strikethrough indicates that the claim was canceled, disclaimed, or held invalid by a prior post-patent action or proceeding.

This application is a continuation-in-part of PCT Application No. PCT/KR2008/001695 filed on Mar. 26, 2008. This document is hereby incorporated by reference.

BACKGROUND

1. Field

This relates to a refrigerator, and in particular, to a structure for moving a drawer of a refrigerator.

2. Background

A refrigerator is an appliance for the storage of fresh food. Refrigerators may generally be categorized into top freezer types, bottom freezer types, and side-by-side refrigerators, depending on the respective positions of the freezer and refrigeration compartments.

For example, the bottom freezer configuration has the freezer compartment positioned below the refrigeration compartment. In the bottom freezer configuration, a door that pivots about an edge of the main body may open and close the refrigeration compartment, and a door that opens and closes the freezer compartment may be provided with a storage box door that moves forward and rearward relative to the main body. Because in this configuration the freezer compartment is provided below the refrigeration compartment, a user stoops to grasp and pull the door forward in order to open the freezer compartment. A system to facilitate the opening and/or closing of such a freezer compartment would enhance the utility or convenience of a bottom freezer type refrigerator. Further, a system to facilitate opening and/or closing of a drawer in a refrigerator would enhance user convenience.

BRIEF DESCRIPTION OF THE DRAWINGS

The embodiments will be described in detail with reference to the following drawings in which like reference numerals refer to like elements wherein.

DETAILED DESCRIPTION

Figure 1:
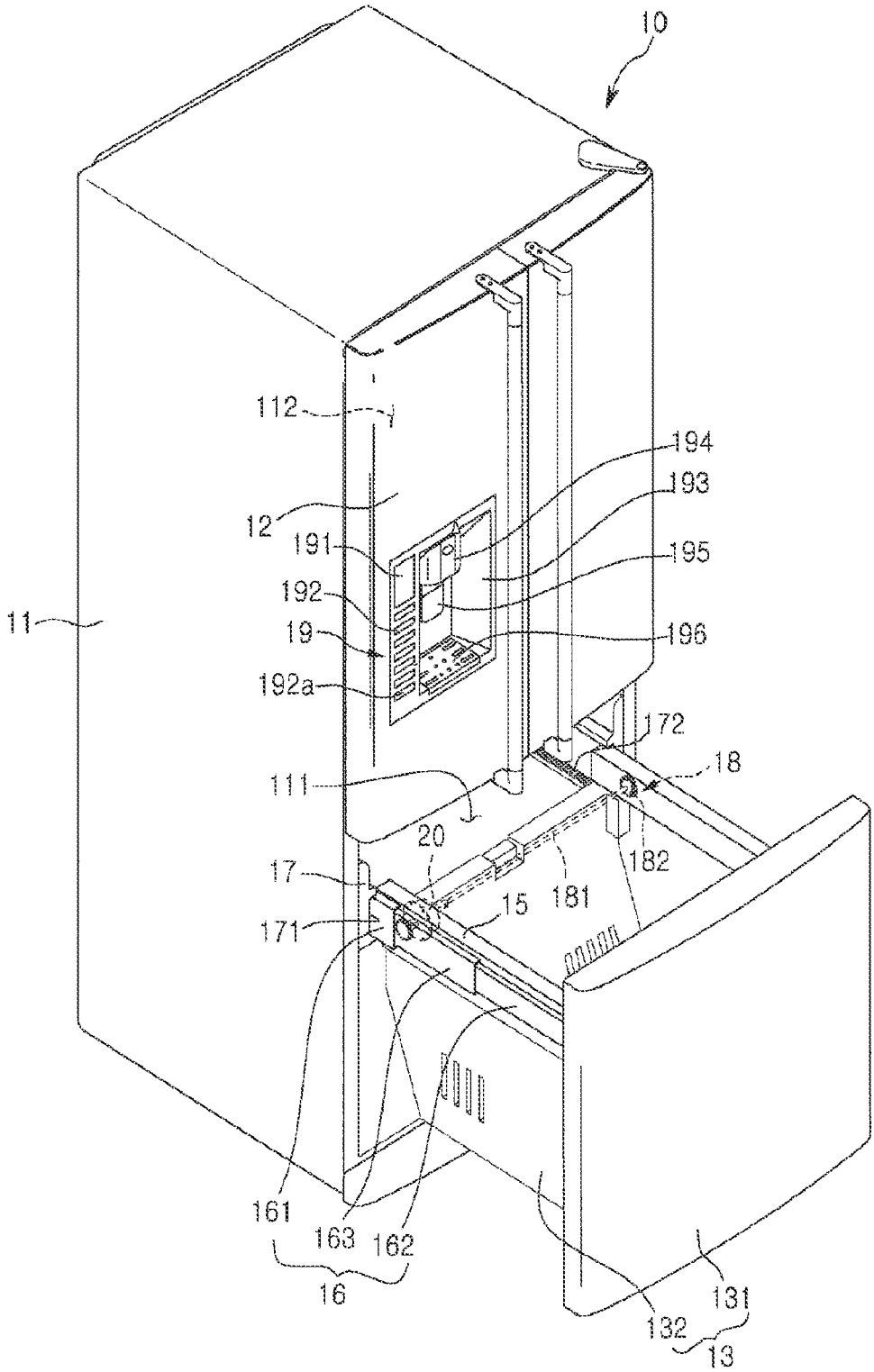
FIG. 1 is a perspective view of an exemplary refrigerator provided with a drawer movement structure according to an embodiment as broadly described herein.

To facilitate the opening and/or closing of a compartment of a refrigerator, such as, for example, a lower freezer compartment, an automatic opening configuration may be provided. This automatic opener may determine when a user intends to open a compartment door by sensing a gripping or grasping of a door handle as the compartment door is moved a predetermined distance forward from the front surface of the main body, and then automatically moving the door, and the storage box to which it is coupled, to an open position. A motor may be provided with the appropriate compartment, and a rotating member such as, for example, a gear may be connected to a shaft of the motor. As an undersurface of the storage box comes into contact with the rotating member, the storage box moves forward and rearward based on a direction of the rotation of the rotating member.

However, when using this type of automatic opener, a user still grasps and exerts a pulling force on the handle to initiate the automatic opening. Typically, a sealing member such as, for example, a gasket may be attached to the rear surface of the storage box to prevent cold air leakage, and an adhering member such, for example, as a magnet may be provided inside the sealing member to maintain a tight seal therebetween. Thus in order to initiate movement of the storage box, a user grasps and pulls the storage box with a force greater than the magnetic force. In addition, when the storage box is provided at the bottom of the refrigerator, a user stoops to pull it out, which may be physically challenging for children, the elderly, and smaller users. Also, the handle protrudes from the front surface of the storage box, thereby increasing the dimensions for the packaging and installation of the refrigerator and presenting a potential hazard for users who may collide with the handle. It is difficult or not possible to omit the handle in this type of automatic opener.

Further, the time it takes for a user to grasp a handle and initiate movement of the storage box, coupled with the time it takes for a controller to sense this movement and provide for automated movement of the storage box may be excessive, thus reducing utility. Additionally, the automatic opener may only move the storage box a distance adequate to separate it from the refrigerator main body, and thus a user still directly grasps the handle and pulls the storage box further forward thereafter. When the weight of food stored in the storage box may be considerable, withdrawing the storage box in this manner may be difficult.

By providing a drive motor and a gear assembly on the floor of the refrigeration compartment or the freezer compartment to provide for movement of a storage box provided therein, the storage space within the refrigerator may be reduced by the volume consumed by the motor and gear assembly. This may also result in a loss of insulation in the refrigerator main body. That is, if the inner case were to be recessed to receive a motor, an insulating layer between the inner case and an outer case of the main body would become thinner, thus reducing insulation between the inside and outside of the refrigerator.

Further, if movement of the storage box is driven by this type of motor and gear assembly, such a gear assembly would likely include a rack that engages a gear, the rack extending from front to rear along the floor of the storage box. Thus, the length of the rack would necessarily be limited by the overall length of the floor of the storage box. For example, the rear surface of a freezer compartment storage box in a bottom freezer refrigerator may be sloped to accommodate a machine room provided at a lower rear portion of the refrigerator. Thus the length of the lower portion of the freezer compartment storage box may be less than the length of the upper portion thereof, limiting accessibility to the interior of the storage box. If a plurality of storage boxes are provided one on top of another, a separate motor and gear assembly may be provided for each storage box, thereby complicating the support structure required for the stack storage boxes.

Additionally, the automatic opener described above may include a mechanism such as, for example, a switch, to simply sense whether or not the storage box has been fully withdrawn or closed. However, this switch would not be necessarily sense whether or not the storage box is being withdrawn at a normal speed, whether or not the withdrawing of the storage box is impeded by obstacles, and whether or not the storage box is being withdrawn at a set speed regardless of the weight of food stored therein.

Figure 2:
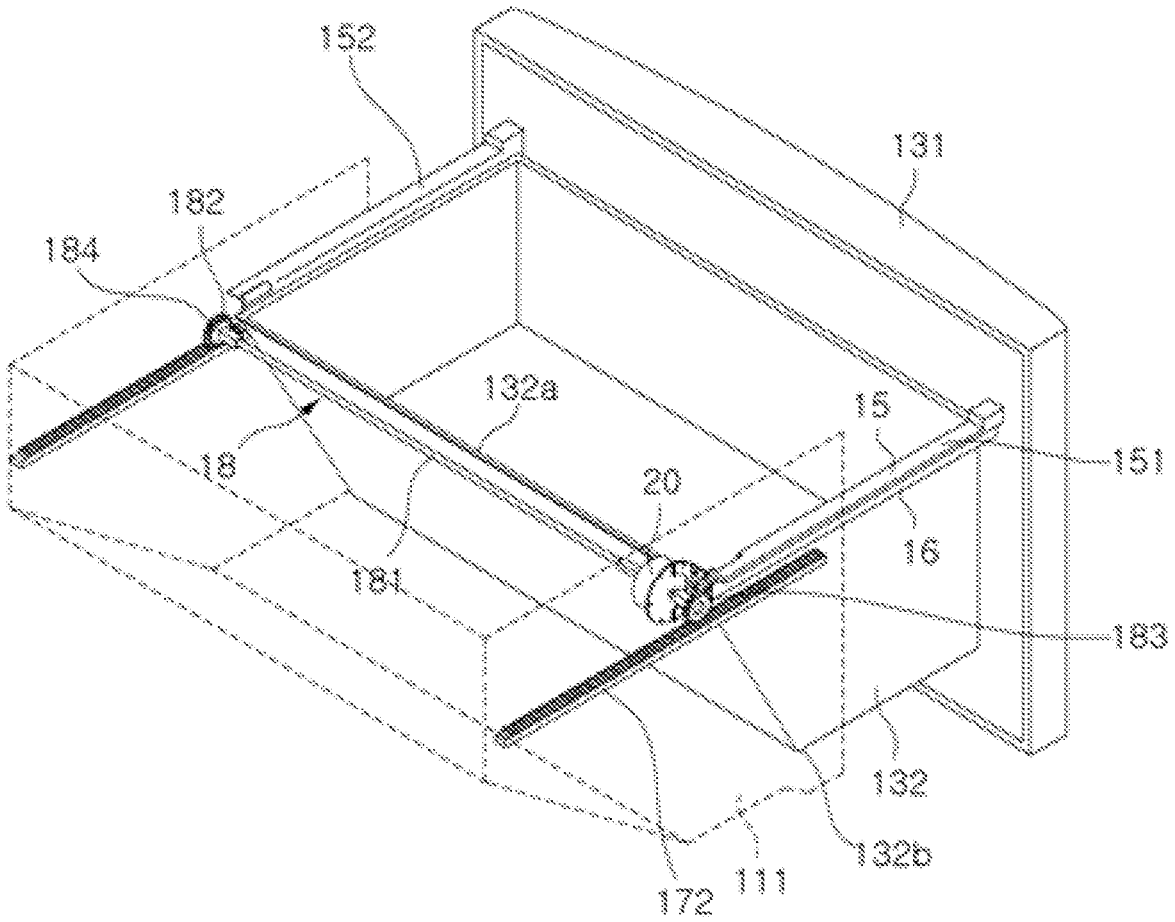
FIG. 2 is a perspective view of a storage box assembly for the exemplary refrigerator shown in FIG. 1.

The exemplary bottom freezer type refrigerator 10 shown in FIGS. 1 and 2 may include a main body 11 that defines a refrigeration compartment 112 and a freezer compartment 111. A refrigeration compartment door 12 may rotatably installed on the front of the main body 11 to open and close the refrigeration compartment, and a drawer 13 may be provided below the refrigeration compartment. The drawer 13 may be inserted into and withdrawn from the inside of the freezer compartment 111 so that goods or items stored therein may be accessed as necessary.

The drawer 13 may include a door 131 that forms a front exterior of the drawer 13 and a storage box 132 provided behind the door 131 to receive store food items. A frame 15 may extend rearward from a rear of the freezer compartment door 131 to support opposite side edges of the storage box 132, and a rail assembly 16 may be positioned corresponding to the frame 15 to allow the storage box 132 to be inserted into and withdrawn from the freezer compartment 111. The rail assembly 16 may have a first end fixed to an inner surface of the freezer compartment 111, and a second end fixed to the frame 15 to allow the rail assembly 16 to be adjusted in length and to allow the storage box 132 to be inserted into and withdrawn from the freezer compartment 111 along the rail assembly 16.

The refrigerator 10 may also include an anti-wobble, or alignment apparatus for preventing wobbling or mis-alignment as the storage box 132 is withdrawn from or inserted into the freezer compartment 111. A rail guide 17 provided at one or both opposite sides of the freezer compartment 111 corresponding to the rail assembly 16 to hold and guide the rail assembly 16, and a movement apparatus for automatically moving, that is, withdrawing and inserting, the storage box 132 relative to the freezer compartment 111. In detail, the alignment apparatus may include a suspended portion 18 coupled to the rear of the frame 15 to prevent lateral wobbling or uncoordinated lateral movement when the storage box 132 is being withdrawn from or inserted into the freezer compartment 111, and a guide member provided on the rail guide 17 to guide the movement of the suspended portion 18. The guide member may include a rail mounting recess 171 formed in the rail guide 17 to receive the rail assembly 16 and a guide rack 172 that extends from front to rear at the bottom of the rail mounting recess 171.

The suspended portion 18 may include a shaft 181 with its opposite ends connected to a respective portion of the frame 15 provided on opposite sides of the storage box 132, and a pinion 182 provided respectively at one or both ends of the shaft 181. A plurality of gears may be formed on the outer peripheral surface of the pinion 182, and a corresponding plurality of gear teeth may be formed on the upper surface of the guide rack 172 to engage the pinion 182. Accordingly, when the pinion 182 rotates in an engaged state with the guide rack 172, the pinion 182 rolls along the guide rack 172 to in turn move the storage box 132, and the drawer 13 is not biased to the left or right, but is withdrawn in a straight path. Thus, the shaft 181, pinion 182 and guide rack 172 prevent the drawer 13 from wobbling or moving laterally.

In certain embodiments, the drawer 13 may be withdrawn from the refrigerator 10 automatically. For this purpose, the drawer movement apparatus may include a driving force generator coupled to one or all of the pinions 182 to impart a rotational force on the pinions 182, and a driving force transmitter that transmits the driving force from the driving force generator to the pinions 182 to allow the storage box 132 to be moved. The driving force generator may be, for example, a drive motor 20 that provides rotational force to the pinions 182 and the driving force transmitter may be, for example, an anti-wobble or alignment apparatus including the suspended portion 18 and the guide rack 172 as described above. That is, the alignment apparatus may prevent lateral misalignment wobbling of the drawer 13, while also transmitting a driving force that automatically moves the drawer 13. The driving force generator may be provided with the freezer compartment door 131, and may include a drive motor 20 or other driving means capable of automatically moving the drawer 13, such as, for example, an actuator employing a solenoid.

The rail assembly 16 may include a fixed rail 161 fixed to the rail mounting recess 171, a moving rail 162 fixed to the frame 15, and an extending rail 163 that extends between the fixed rail 161 and the moving rail 162. Depending on a front-to-rear length of the storage box 132, the rail assembly 16 may include one or more extending rails 163. In certain embodiments, the rail assembly 16 may include only the fixed rail 161 and the moving rail 162. Additionally, the shaft 181 and the drive motor 20 may be provided at a rear of the frame 15, or may be provided at a rear of the moving rail 162, depending on the particular storage box 132/refrigerator 10 design. The storage box 132 may be detachably coupled to the frame 15 to allow the storage box 132 to be removed from the refrigerator 10 for periodic cleaning.

A dispenser 19 for dispensing water or ice may be provided at the front of the refrigeration compartment door 12. The dispenser 19 may include a receptacle 193 comprising a recess having a predetermined depth, and a chute 194 and a dispensing tap (not shown in detail) through which ice and water may be dispensed by actuating a lever 195. A water pan 196 may be provided on the floor of the receptacle 193. A display 191 for displaying various data such as, for example, an operating state of the refrigerator 10 and a temperature inside the refrigerator 10, and a button panel 192 including various input buttons 192a, may be provided with the dispenser 19. Various commands for withdrawing and inserting the storage box 132 may be input using the input buttons 192a.

An input button 192a for entering a command to withdraw the storage box 132 from or insert the storage box 132 into the refrigerator 10 may be provided in various formats such as, for example, a capacitive switch employing changes in electrostatic capacitance, a tact switch, a toggle switch, or other type of switch as appropriate. Additionally, although the input button 192a shown in FIG. 1 is provided at one side of the dispenser 19, the button panel 192 and/or input buttons 192a may alternatively be provided in a touch button configuration on a front or side surface of the refrigerator or freezer compartment door as appropriate, and not necessarily with the dispenser 19.

For example, if the input button 192a were provided on the front surface of the freezer compartment door 131, the input button 192a may include a vibration sensor switch that operates by detecting vibrations transferred to the freezer compartment door 131. That is, if, for example, a user is unable to use either hand to initiate the opening of the door 131, and instead imparts a gentle shock with, for example, a foot, to the freezer compartment door 131, the vibration transferred from the shock may be sensed and the drive motor 20 may be operated to withdraw the storage box 132 from the freezer compartment 111.

In alternative embodiments, the input button 192a may instead be provided on a separate remote control unit that controls various other functions of the refrigerator, or other devices within a given range. For example, an input button 192a that controls movement of the drawer 23 may be provided with a remote control unit that controls, for example, internal temperatures of the various compartments of the refrigerator, operation of a display module/television mounted on a surface of the refrigerator, and the like.

Figure 3:
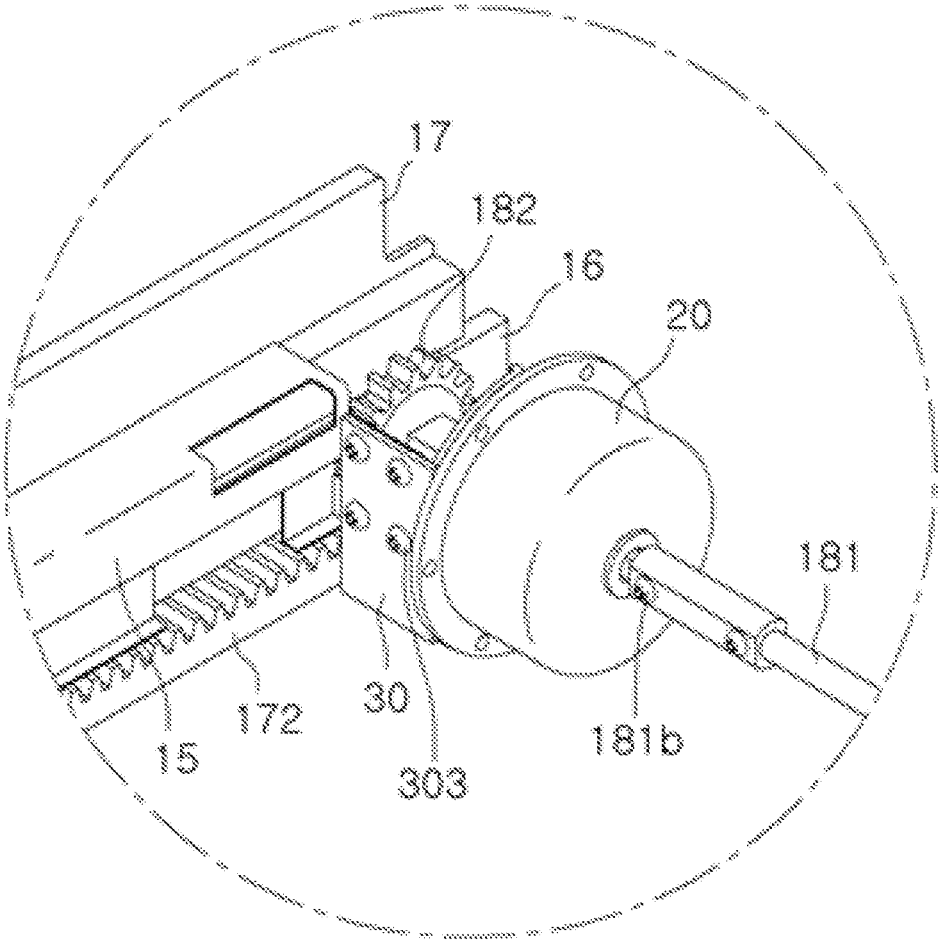
FIG. 3 is a detailed perspective view of a drawer movement apparatus according to an embodiment as broadly described herein.
Figure 4:
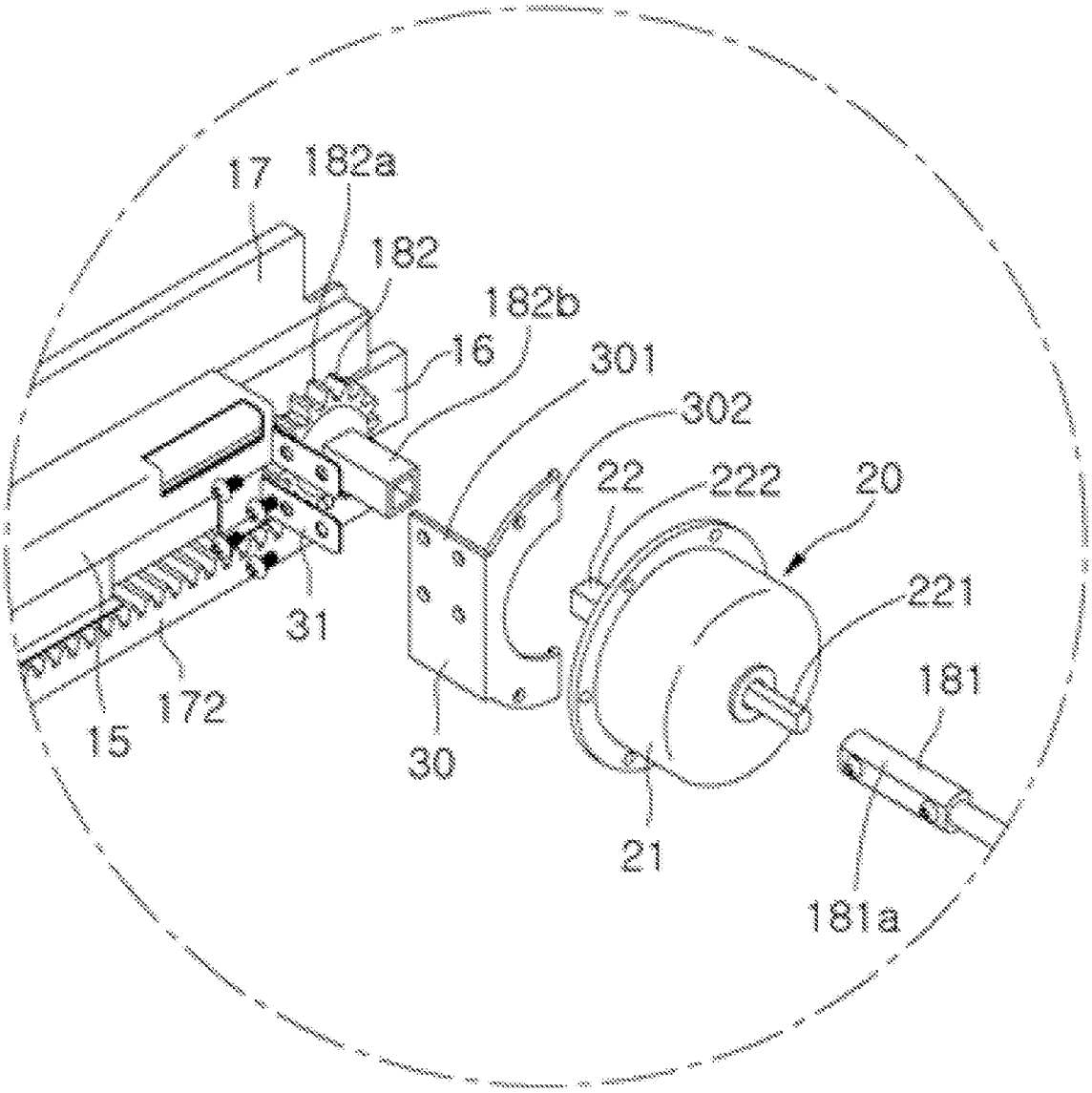
FIG. 4 is an exploded perspective view of the drawer movement apparatus shown in FIG. 3.

A drawer movement apparatus according to an embodiment as broadly described herein is shown in more detail in FIGS. 3 and 4. As discussed above, the anti-wobble, or alignment apparatus may include the suspended portion 18 and the guide rack 172, and the suspended portion 18 may include the shaft 181 and the pinion 182. Although in this embodiment the guide rack 172 and the pinion 182 form the alignment apparatus, these elements may be structured differently as long as they perform the anti-wobble and/or alignment function. For example, a roller surrounded by a friction member may be used instead of the pinion 182, and a friction member that contacts the roller, instead of the guide rack 172, to generate friction may be used to slide the storage box 132 into and out of the refrigerator 10 without slippage.

The drive motor 20 may be an inner rotor type motor, and the pinion 182 may be connected to a motor shaft 22 connected to the rotor. The drive motor 20 may be any motor capable of both forward and reverse rotation and variable speed operation.

Such a rotor and stator, or other components forming the drive motor 20, may be protected by a housing 21. A fastening mount 31 may extend from the frame 15, and the fastening mount 31 and the housing 21 of the drive motor 20 may be coupled by a bracket 30. Accordingly, the assembly of the drive motor 20 and the suspended portion 18 may be fixedly coupled to a rear portion of the frame 15, and the pinion 182 may be coupled to the motor shaft 22 so that pinion 182 may be rotated by the motor 20.

The drive motor 20 may be fixed to the frame 15 by various methods which all fall within the spirit and scope as presented herein. Also, the drive motor 20 may be fixed to the rear of the moving rail 162 instead of to the frame 15. In alternative embodiments, the drive motor 20 may be integrally provided with the frame 15.

Figure 5:
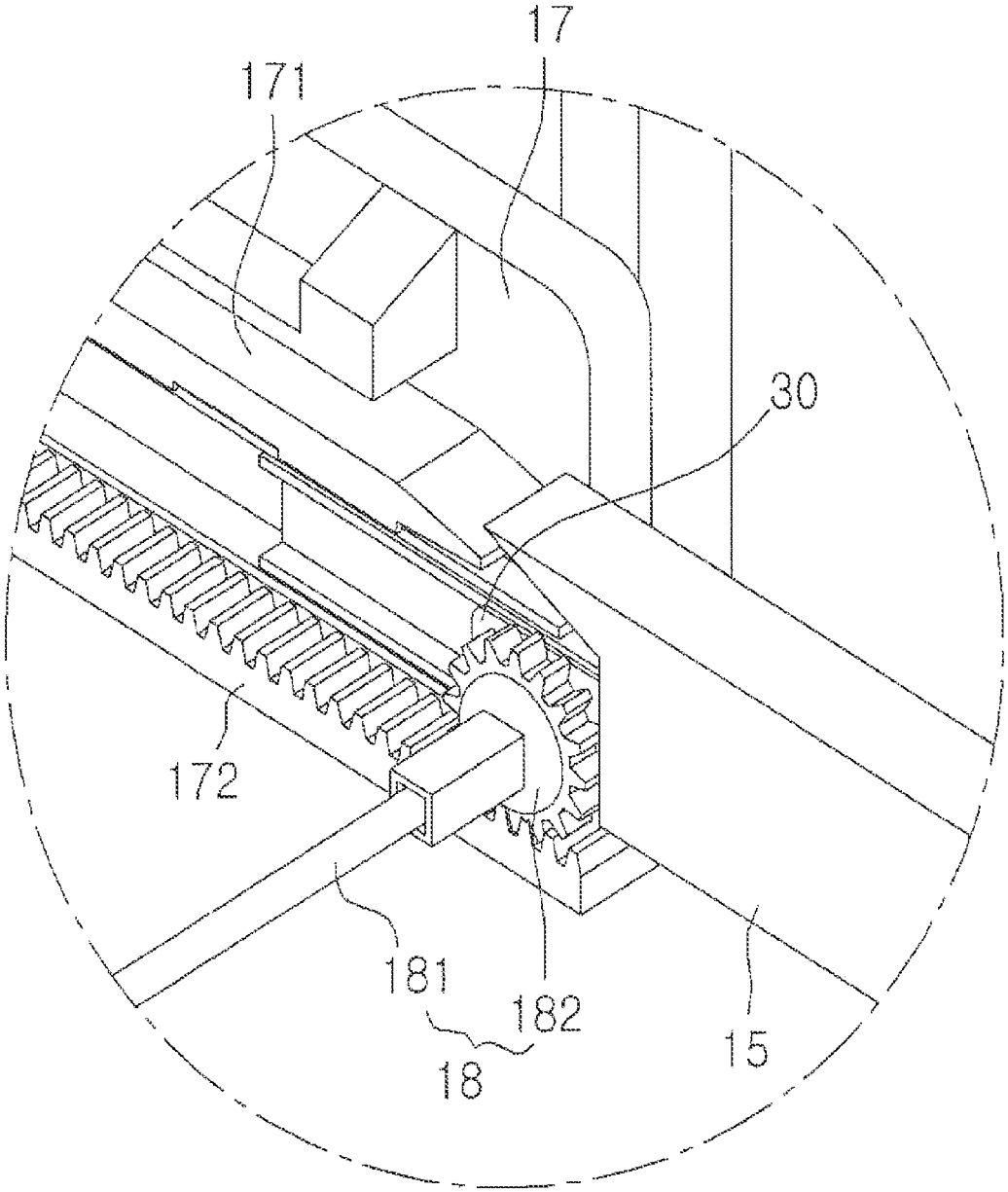
FIG. 5 is a partial perspective view of a suspended portion of the movement apparatus shown in FIG. 3.

The drive motor 20 shown in FIG. 5 is provided at only one end of the suspended portion 18. However, in alternative embodiments, a driving force generator, or drive motor 20, may be provided for each of the pinions 182 at opposite ends of the shaft 181. More specifically, as discussed above, a pinion 182 may be provided at each of the two opposite ends of the shaft 181. At an end of the suspended portion 18 to which a drive motor 20 is not provided, the shaft 181 may pass through the pinion 182 and be inserted into the frame 15. In other words, the bracket 30 provided at this side of the frame 15 may be repositioned such that the shaft 181 passes through the pinion 182 and is inserted into the bracket 30 to securely couple the shaft 181 to the frame 15 and prevent disengagement of one end of the storage box 132 from the frame 15 or lateral wobbling/mis-alignment of the storage box 132 during withdrawal and insertion of the storage box 132.

Alternatively, the end of the shaft 181 may instead be inserted into a rear portion of the moving rail 162, as described above.

The automatic movement process of a storage box 132 from a refrigerator 10 provided with a storage box movement apparatus as embodied and broadly described herein will now be discussed.

In order to withdraw the storage box 132 from a corresponding compartment of the refrigerator 10, a user first actuates an input button 192a, which, as discussed above, may be provided at one side of the dispenser 19, on a surface of the refrigerator 10, or on a remote control unit, as appropriate. Similarly, actuation of the input button 192a may be accomplished by simply pushing the button 192a, or by imparting an external shock to an appropriate portion of the refrigerator 10 to actuate a vibration sensor switch. When the input button 192a is actuated to initiate a storage box withdrawing command, the command is transmitted to a controller (not shown in detail) of the refrigerator 10. The controller of the refrigerator 10 transmits an operation signal to a drive motor controller that controls the operation of the drive motor 20. This operation signal may include, for example, directional data for moving the storage box 132 either out of or into the refrigerator 10, and moving speed data for the storage box 132. That is, the directional data indicates which direction the drive motor 20 should be rotated, and the speed data indicates a number of revolutions per minute (RPM) of the drive motor 20 to achieve a particular speed.

The drive motor 20 may then be driven according to the operation signal in order to move the door 131 and storage box 132 accordingly. This allows the storage box 132 to be automatically withdrawn from the refrigerator 10 without requiring a user to apply a specific, physical withdrawing movement, thus eliminating the need for a separate handle member on the front surface of the door 131. Thus, the door 131 may have a flush front surface without any protrusions to provide a clean exterior finish, and to provide an inner cover coupled to the rear of the outer cover with an insulator interposed therebetween to preserve the insulative qualities of the refrigerator 10.

The controller of the refrigerator 10 may receive RPM data associated with the rotation of the drive motor 20 in real time, and may calculate the withdrawing speed (in m/s or other unit, as appropriate) of the storage box 132 accordingly. For example, using the rotating speed of the drive motor 20 and a circumferential value of the pinion 182, the moving speed of the storage box 132 can be calculated per unit time. Using this data, the storage box 132 may be withdrawn at a preset speed, regardless of the weight of food stored in the storage box 132. In certain embodiments, the preset speed may be a speed which is selected by a user, and which may also be altered based on user preferences The storage box 132 may be continuously or intermittently withdrawn from or inserted into the refrigerator 10 according to how the input button 192a is manipulated. For example, the storage box 132 may be controlled so that it is completely withdrawn if the input button 192a is pressed once and/or held for a predetermined amount of time. Similarly, the storage box 132 may be controlled so that it is withdrawn in stages if the input button 192a is pressed repeatedly with a certain interval in between pressings. Other arrangements may also be appropriate.

The storage box 132 may also be controlled so that its movement is automatically stopped if the storage box 132 encounters an obstacle as the storage box 132 is moved.

The storage box 132 may be controlled so that it is stopped when it has been withdrawn a predetermined distance, and may be controlled so that it is either reinserted or withdrawn completely, based on the user's particular intentions. For example, if the storage box 132 has been stopped after being withdrawn a predetermined distance, the storage box 132 may then be completely withdrawn when a user pulls the freezer compartment door 131, or the storage box 132 may be re-inserted into the refrigerator 10 when a user pushes the freezer compartment door 131.

If a storage box withdrawal command is input through the input button 192a, and the storage box 132 is not in a withdrawn or open state, or stops during withdrawal, this may be sensed and an error signal may be generated. The storage box 132 may be controlled so that it is automatically closed when left in a withdrawn or open state for more than a predetermined amount of time, in order to minimize cold air loss.

*The frame 15 may include a first frame 151 extending rearward from a rear of the door, and a second frame 152 extending rearward from the rear of the door. At least one rolling member is connected to an end of the shaft 181.*

*The at least one rolling member may include a first rolling member 183 and a second rolling member 184. The motor shaft 22 includes a first motor shaft 221 connected to the shaft 181 and a second motor shaft 222 connected to the first rolling member 183. The first motor shaft 221 is inserted in the first end 181a of the shaft 181. A coupling member 181b is configured to couple the first motor shaft 221 and the first end 181a of the shaft 181.*

*The first rolling member 183 includes a pinion 182 having gear teeth 182a that are located on an outer peripheral surface of the pinion, and a connection portion 182b extended from the pinion and connected to the second motor shaft 222. The second motor shaft 222 is inserted in the connection portion 182b of the first rolling member 183. A cross section of each of the first and second motor shafts 221 and 222 is non-circular. The motor 20 is spaced apart from the first frame 151 in a first direction crossing a longitudinal direction of the first frame 151.*

*The bracket 30 is disposed between the first frame 151 and at least a portion of the motor 20.*

*The first frame 151 includes a fastening mount 31 extended from the first frame 151 in the first direction. The bracket 30 may include a first part 301 connected to the fastening mount 31 and a second part 302 bent from the first part 301 and connected to the motor 20. A coupling member 303 is configured to couple the fastening mount 31 and the first part 301 in the longitudinal direction of the first frame.*

*The first part 301 is disposed between an upper rear end of the drawer 23 and the motor shaft 22 of the motor. The second part 302 surrounds at least a portion of the motor shaft 22 of the motor.*

*The storage box 132 may include an upper rear end 132a and a lower rear end 132b. A distance between the upper rear end 132a of the storage box and the door is greater than a distance between the lower rear end 132b of the storage box and the door. The shaft 181 is located closer to the upper rear end 182a of the storage box than the lower rear end 182b of the storage box. A distance between the shaft 181 and the door is greater than the distance between the upper rear end 182a of the storage box and the door. The upper rear end 182a of the drawer is positioned higher than the shaft 181.*

*The rail assembly 16 is positioned to correspond to the first and second frames 151 and 152 to allow the storage box 132 to be inserted into and withdrawn from the at least one compartment. The rail assembly, the first and second frames 151 and 152, and the at least one rolling member are positioned higher than the guide rack 172.*

*The at least one rolling member moves forward and rearward based on the at least one rolling member interacting with gear teeth provided on the upper surface of the guide rack 172.*

*The motor shaft 22 is positioned higher than the guide rack 172 and lower than an upper surface of the first frame 151.*

*The at least one guide member may include a rail mounting recess 171 configured to receive the rail assembly 16. The guide rack 172 extends from a bottom of the rail mounting recess 171 in a horizontal direction.*

The storage box 132 of a refrigerator 10 according to embodiments as broadly described herein may not only be automatically withdrawn, but withdrawn manually as well. For example, in the event of a power outage where power cannot be supplied to the drive motor 20, or when a user does not manipulate the input button 192a but instead grasps and pulls or pushes the door 131 by hand, the storage box 132 is not subjected to resistance from the drive motor 20 and may be smoothly withdrawn or re-inserted into the refrigerator 10. Even when the power is not supplied to the motor, withdrawal of the storage box 132 is not impeded by the drive motor 20.

As an alternative to the drive motor 20 being connected to the controller of the refrigerator 10 by a plurality of signal wires and receiving power through a plurality of electrical wires, a charging apparatus may be provided with the drive motor 20 to eliminate the need for electrical wires, and a short range wireless transmitter-receiver system may be provided to eliminate the need for signal wires and electrical wires.

Although, for ease of discussion, the drawer movement apparatus has to this point been applied to the movement of a freezer compartment door in a bottom freezer type refrigerator, it is well understood that such an apparatus can be applied to advantageous effect in other types of household appliances. For example, FIG. 6 is a perspective view of an inner structure of a refrigerator according to another embodiment in which a drawer movement apparatus as embodied and broadly described herein is applied to a side-by-side refrigerator.

Figure 6:
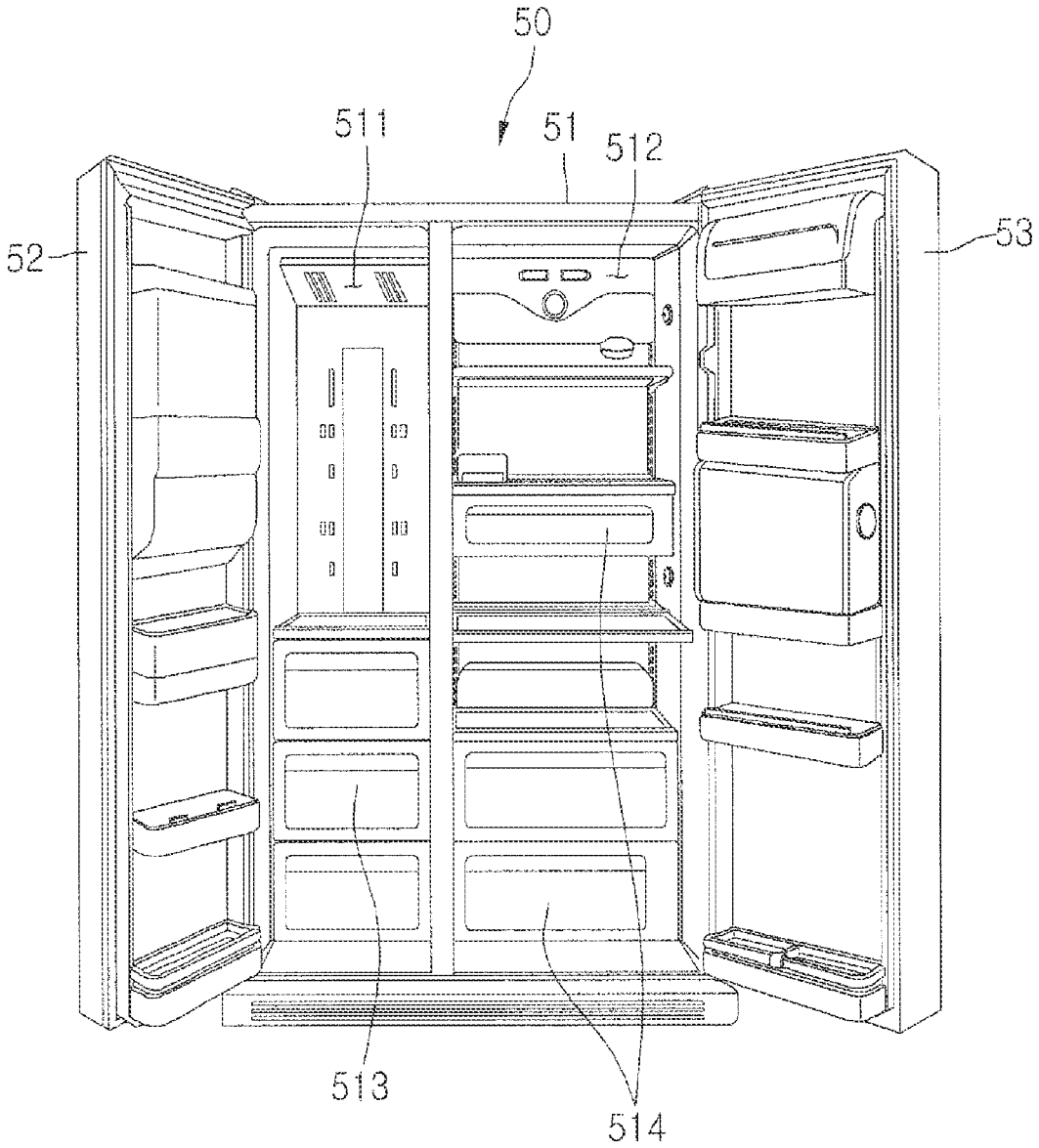
FIG. 6 is a perspective view of an interior of a refrigerator according to an embodiment as broadly described herein.

The refrigerator 60 shown in FIG. 6 may include a main body 51 provided with a freezer compartment 511 and a refrigeration compartment 512, a freezer compartment door 52 that opens and closes the freezer compartment 511, and a refrigeration compartment door 53 that opens and closes the refrigeration compartment 512.

A plurality of freezer compartment drawers 513 may be stacked within the freezer compartment 511. To accommodate different types of food and associated freezing requirements, the freezer compartment drawers 513 may be maintained at different temperatures and/or at a different temperature than the rest of the freezer compartment 511 interior. Likewise, a plurality of refrigeration compartment drawers 514 may be provided within the refrigeration compartment 512 to preserve food at appropriate refrigerated temperatures, such as, for example, 3°-4° C. A drawer movement structure as described above and as shown in FIGS. 1-5 may also be provided with the drawers 513 and 514 to provide for their automatic movement.

Figure 7:
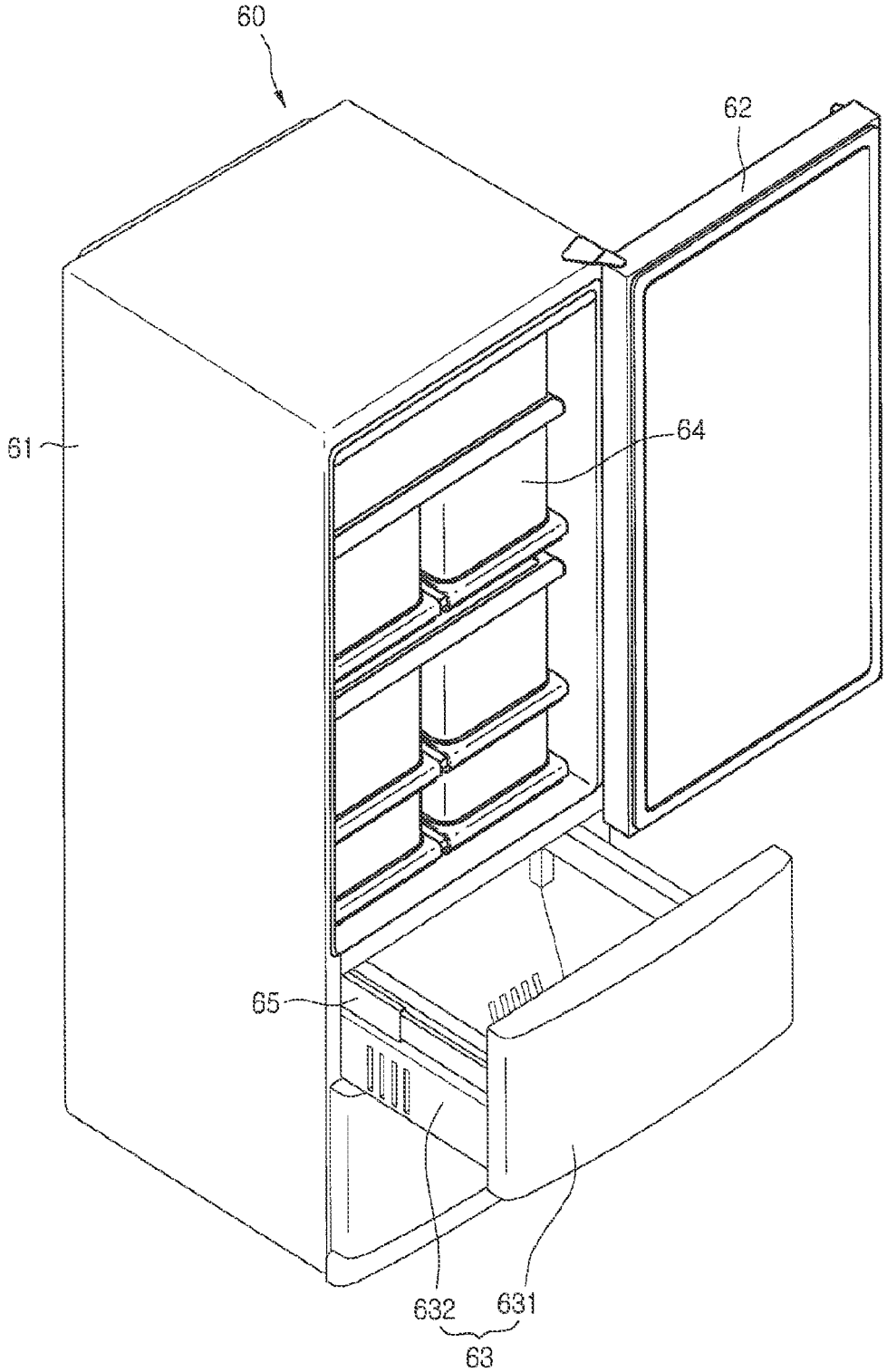
FIG. 7 is a perspective view of a refrigerator according to another embodiment as broadly described herein.

FIG. 7 is a perspective view of an inner structure of a refrigerator according to another embodiment in which a drawer movement apparatus as broadly described herein is applied to a standing refrigerator having a plurality of segregated compartments such as, for example, a standing kimchi refrigerator.

The refrigerator 60 shown in FIG. 7 may include a main body 61 having a plurality of upper storage compartments, an upper door 62 rotatably coupled to a front of the main body 61 to open and close the upper storage compartments, and a drawer 63 that may be withdrawn from and inserted into a lower storage compartment provided below the upper storage compartments. In alternative embodiments, the relative positions of the upper and lower, or primary and auxiliary, storage compartments may be adjusted as appropriate.

A plurality of storage boxes 64 may housed in the plurality of upper storage compartments. The drawer 63 may be formed of a storage box 632, and a door 631 provided vertically at the front of the storage box 631 to form a front portion of the main body 61. Rails 65 may be provided on the side surfaces of the drawer 63 to allow forward, multi-stage withdrawal and insertion of the drawer 63. Thus, the drawer movement apparatus as described above and as shown in FIGS. 1-5 may be provided at the rear of the drawer 63 and also at the sides of the storage compartment in which the drawer 63 is housed.

Figure 8:
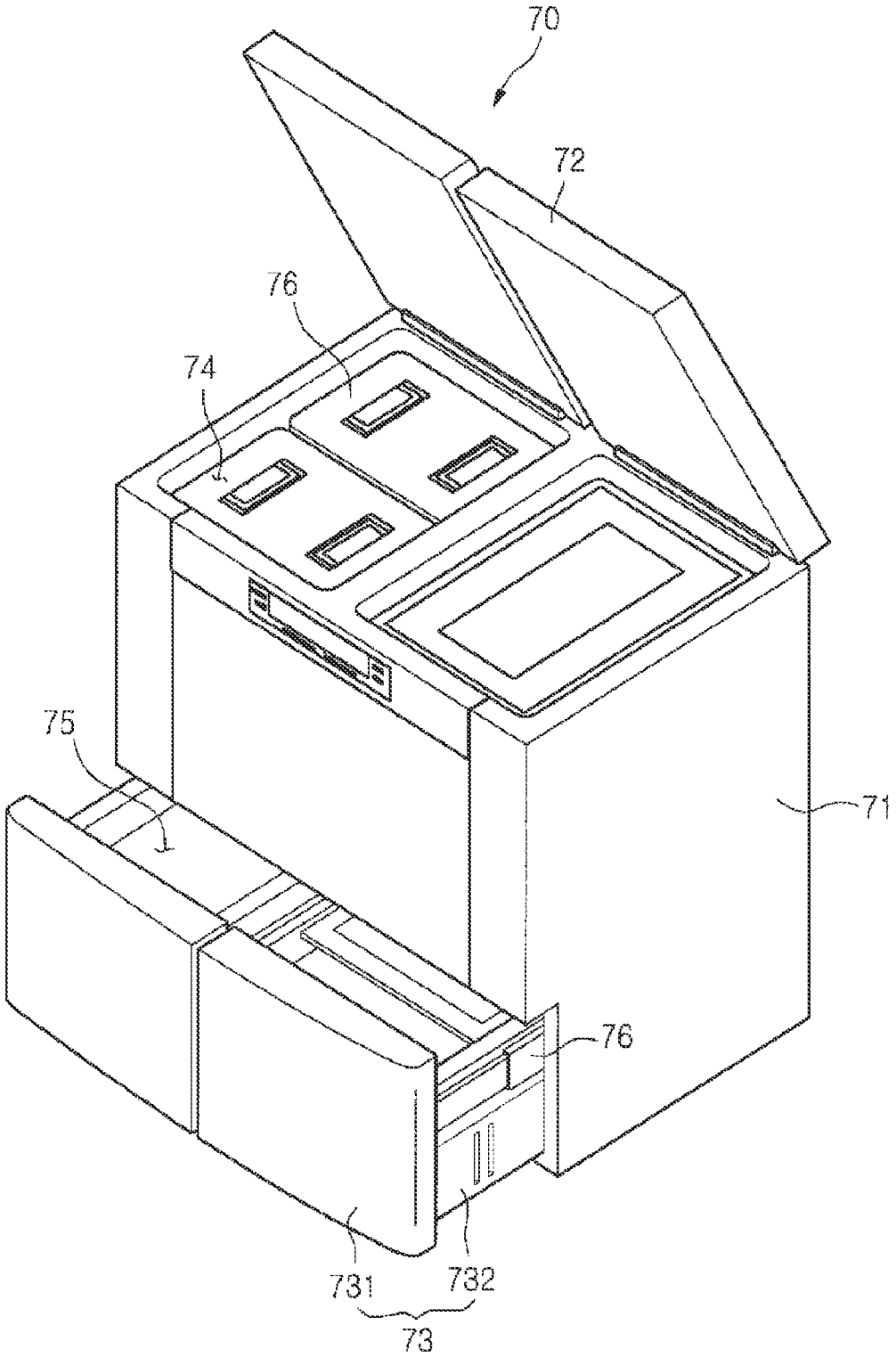
FIG. 8 is a perspective view of a refrigerator according to another embodiment as broadly described herein.

FIG. 8 is a perspective view of a refrigerator according to another embodiment in which a drawer movement apparatus as embodied and broadly described herein is applied to a chest type refrigerator having a lid, such as, for example, a chest type kimchi refrigerator having multiple segregated compartments.

The refrigerator 70 shown in FIG. 8 may include a main body 71 provided with an upper storage compartment 74 and a lower storage compartment 75, an upper door 72 rotatably coupled to an upper portion of the main body 71 to open and close the upper storage compartment 74, and a drawer 73 housed within the lower storage compartment 75. The upper storage compartment 74 may be recessed downward into the main body 71, and the lower storage compartment 75 may be recessed from front to rear beneath the upper storage compartment 74.

The upper storage compartment 74 may be compartmentalized into a plurality of compartments laterally, from front to rear, or other arrangements as appropriate. A plurality of storage boxes 76 may be stacked and housed within the upper storage compartment 74. The drawer 73 provided in the lower storage compartment 75 may include a storage box 732 and a door 731 provided at the front of the storage box 732. Rails 76 may be provided on the sides of the drawer 73 to permit withdrawal/insertion in stages. A drawer movement structure as described above and as shown in FIGS. 1-5 may be provided at the rear of the drawer 73 and at the sides of the lower storage compartment 75 to facilitate the automated movement of the drawer 73.

A refrigerator is provided that does not require a handle structure to withdraw a storage box therefrom.

A refrigerator is provided that allows for automatic withdrawal of a storage box from the refrigerator by means of an improved withdrawing structure.

A refrigerator is provided that has a structure for fixedly installing a driving unit that withdraws a storage box from and inserts a storage box into the refrigerator while minimizing reductions in interior storage volume and insulating effectiveness of the refrigerator.

A refrigerator is provided that can consistently withdraw a storage box from and insert a storage box into the refrigerator at a preset speed regardless of the weight of food stored therein is also provided.

In one embodiment, a refrigerator as broadly described herein may include a main body provided with at least one of a refrigeration compartment and a freezer compartment; an evaporator provided at a side of the main body to generate cold air; a drawer for storing food provided to the refrigeration compartment or the freezer compartment, the drawing being capable of being withdrawn; a rolling member provided at a rear of the drawer; a guide member extending from front to rear on side surfaces of the refrigeration compartment or the freezer compartment, to guide the movement of the rolling member; and a drive motor providing rotational force to the rolling member.

In another embodiment, a refrigerator as broadly described herein may include a main body provided with one or all of a refrigeration compartment maintained at a temperature above freezing and a freezer compartment maintained at a temperature below freezing; an evaporator provided on the main body to generate cold air; a compressor compressing refrigerant that passes through the evaporator; a condenser condensing refrigerant that passes through the compressor; an expansion member expanding refrigerant that passes through the condenser to a low temperature and low pressure; a drawer housed in at least one of the refrigeration compartment and the freezer compartment, and provided without a handle structure for grasping on an outer surface thereof; an anti-wobble apparatus preventing wobbling of the drawer while the drawer is being moved; a drive motor integrally provided on a portion of the anti-wobble apparatus; an input button for inputting a moving command of the drawer; and a signal transmitter provided to transmit a driving command input through the input button to the drive motor.

In another embodiment, a refrigerator as broadly described herein may include a main body provided with a refrigeration compartment or a freezer compartment; an evaporator provided in the main body to generate cold air; a compressor for compressing refrigerant that passes through the evaporator; a condenser for condensing refrigerant that passes through the compressor; an expansion member for expanding refrigerant that passes through the condenser to a low temperature and low pressure; a drawer that is withdrawn in a straight line from an inside of the refrigeration compartment or the freezer compartment; and a withdrawing apparatus provided with a driving force generator generating driving force for withdrawing the drawer, and a driving force transmitter enabling the drawer to be withdrawn through the driving force, wherein at least the driving force generator moves together with the drawer.

A movement structure for a storage box of a refrigerator and a refrigerator equipped with such a movement structure allows the storage box to be automatically withdrawn or inserted, thus providing greater convenience of use. Moreover, because the storage box can be withdrawn automatically, the storage box can be conveniently withdrawn regardless of the weight of food stored in the storage box.

Additionally, a separate handle is not required for withdrawing and inserting a storage box from/into a refrigerator. This allows the external design of the refrigerator to have a clean finish, and the space in which the refrigerator is installed to be effectively utilized.

Further, because the drive motor moves together with the storage box uses a minimal amount of storage space and has a minimal effect on the insulation qualities of the refrigerator main body.

Any reference in this specification to "one embodiment," "an embodiment," "example embodiment," "certain embodiment," "alternative embodiment," etc., means that a particular feature, structure, or characteristic described in connection with the embodiment is included in at least one embodiment as broadly described herein. The appearances of such phrases in various places in the specification are not necessarily all referring to the same embodiment. Further, when a particular feature, structure, or characteristic is described in connection with any embodiment, it is submitted that it is within the purview of one skilled in the art to effect such feature, structure, or characteristic in connection with other ones of the embodiments.

Although embodiments have been described with reference to a number of illustrative embodiments thereof, it should be understood that numerous other modifications and embodiments can be devised by those skilled in the art that will fall within the spirit and scope of the principles of this disclosure. More particularly, various numerous variations and modifications are possible in the component parts and/or arrangements of the subject combination arrangement within the scope of the disclosure, the drawings and the appended claims. In addition to variations and modifications in the component parts and/or arrangements, alternative uses will also be apparent to those skilled in the art.

What is claimed is:

[1. A refrigerator, comprising:

at least one compartment;

an evaporator that supplies cold air to the at least one compartment;

a drawer provided for the at least one compartment;

a shaft that extends from a first lateral side of the drawer to a second lateral side of the drawer along a rear portion of the drawer;

at least one rolling member connected to an end of the shaft;

at least one guide member extending from a front portion to a rear portion of the at least one compartment, wherein the at least one rolling member is received in the at least one guide member; and a motor connected to the shaft, wherein the motor rotates the shaft and the at least one rolling member connected thereto such that the at least one rolling member moves along the at least one guide member, wherein the shaft, the motor and the at least one rolling member move integrally with the drawer.]

[2. The refrigerator of claim 1, wherein the motor is a variable speed drive motor.]

[3. The refrigerator of claim 1, wherein the at least one rolling member comprises at least one pinion coupled to the end of the shaft and the at least one guide member comprises at least one guide rack that engages the at least one pinion.]

[4. The refrigerator of claim 3, wherein the at least one pinion comprises a pair of pinions respectively coupled to opposite ends of the shaft, and the at least one guide rack comprises a pair of guide racks respectively positioned on opposite lateral side surfaces of the at least one compartment so as to respectively engage the pair of pinions.]

[5. The refrigerator of claim 1, further comprising a switch electrically coupled to the motor to selectively drive the motor and withdraw the drawer from or insert the drawer into the at least one compartment.]

[6. The refrigerator of claim 5, wherein the switch comprises an input button provided on an outer portion of the refrigerator, wherein actuation of the input button drives the motor to rotate at least one pinion coupled to an end of the shaft and withdraw the drawer from or insert the drawer into the at least one compartment based on a direction of rotation of the motor.]

[7. The refrigerator of claim 5, wherein the switch comprises a switch that senses an external force applied to a predetermined portion of the drawer and drives the motor in response thereto.]

[8. The refrigerator of claim 7, wherein the external force comprises an impact to the drawer that drives the motor to automatically move the drawer from a closed state to an open state, or from an open state to a closed state.]

[9. The refrigerator of claim 1, wherein the drawer is configured to be manually withdrawn or inserted by one of a pulling force or a pushing force.]

[10. The refrigerator of claim 1, wherein the at least one rolling member comprises a roller that is rotated by the motor and a first friction member that surrounds an outer periphery of the roller, and wherein the at least one guide member comprises a member that contacts the rolling member so as to generate friction therebetween.]

11. A refrigerator, comprising:

a main body having at least one storage compartment;

an evaporator that supplies cold air to the at least one storage compartment;

a drawer provided [with] *within* the at least one storage compartment;

a movement apparatus that allows movement of the drawer relative to the at least one storage compartment, the movement apparatus comprising:

a motor that generates a driving force in response to an input, and moves together with the drawer; and a driving force transmitter that transfers the driving force into a movement of the drawer, the driving force transmitter comprising:

a shaft that extends from a first lateral side of the drawer to a second lateral side of the drawer, along a rear portion of the drawer; and at least one rolling member connected to an end of the shaft so as to receive the driving force from the motor via the shaft and move the drawer in a corresponding direction.

12. The refrigerator of claim 11, wherein the motor comprises a variable speed drive motor capable of forward and reverse rotation.

13. The refrigerator of claim 11, wherein the at least one rolling member of the driving force transmitter comprises a pair of rolling members respectively provided at opposite ends of the shaft, the pair of rolling members comprising:

a pair of pinions respectively coupled to opposite ends of the shaft; and a pair of rack guides that extend from a front portion to a rear portion of the at least one compartment, positioned along opposite inner lateral sides of the at least one compartment corresponding to the pair of pinions so as to engage the pair of pinions.

14. The refrigerator of claim 13, wherein the motor generates a rotational force that rotates at least one of the pair of pinions, and wherein the pair of pinions rotate along the pair of rack guides so as withdraw the drawer from or insert the drawer into the at least one compartment based on a direction of rotation of the pair of pinions.

15. The refrigerator of claim 11, wherein the input is provided through a button provided on an outer portion of the main body, wherein actuation of the button activates the motor.

16. The refrigerator of claim 11, wherein the input is provided through a switch that senses an external force applied to a predetermined portion of the drawer and activates the motor.

17. The refrigerator of claim 11, wherein the drawer is configured to move automatically by an operation of the movement apparatus or to move manually by a force applied thereto.

18. The refrigerator of claim 11, wherein the at least one storage compartment comprises a plurality of vertically stacked compartments, each having a drawer movably coupled thereto, and each having a movement apparatus that provides for automatic or manual movement of each drawer relative to its respective storage compartment.

19. A refrigerator comprising:

a housing having a first compartment;

an evaporator to provide cold air;

a first drawer for the first compartment;

a door provided on the first drawer;

a first pinion and a first guide rack provided between the first compartment and the first drawer, the first pinion being movable along the first guide rack, the first pinion having a plurality of first teeth, and the first guide rack having a plurality of second teeth along a prescribed length of the first guide rack; and a first motor coupled to the first pinion, wherein, based on an operation of the motor, the first drawer is moved from a first position to a second position relative to the first compartment by movement of the first pinion along the first guide rack, *wherein the first pinion and the first motor move integrally with the first drawer, and* wherein the motor is activated or deactivated by at least one of an input provided on a panel of the housing, a vibration detected on the door, or a remote control.

20. The refrigerator of claim 19, wherein in the first position, an interior of the first compartment is inaccessible, and in the second position, access to the interior of the first compartment is allowed.

21. The refrigerator of claim 19, wherein the first position is a fully closed position and the second position is one of a partially open position or a fully open position.

22. The refrigerator of claim 19, further comprising a second pinion and a second guide rack provided between the first compartment and the first drawer, the second pinion being movable along the second guide rack.

23. The refrigerator of claim 22, further comprising a shaft coupled to the first pinion and connected to the second pinion.

24. The refrigerator of claim 23, wherein the first guide rack is provided on a first lateral side of the first compartment, and the second guide rack is provided on a second lateral side of the first compartment, the first and second lateral sides being opposite sides.

25. The refrigerator of claim 19, wherein the plurality of first and second teeth are formed by a plurality of grooves.

*26. A refrigerator, comprising:*

*at least one compartment;*

*an evaporator that supplies cold air to the at least one compartment;*

*a drawer provided for the at least one compartment, the drawer including:*

*a door that forms a front exterior of the drawer,*

*a storage box located behind the door and configured to receive food items,*

*a first frame extending rearward from a rear of the door, and*

*a second frame extending rearward from the rear of the door;*

*a shaft that extends from a first lateral side of the drawer to a second lateral side of the drawer along a rear portion of the storage box of the drawer;*

*at least one rolling member connected to an end of the shaft;*

*at least one guide member extending from a front portion to a rear portion of the at least one compartment and including a guide rack configured to guide movement of the at least one rolling member, wherein the at least one rolling member is received in the at least one guide member; and*

*a motor connected to the shaft, wherein the motor is located at one side of the shaft at a side of the first frame of the door, and wherein the motor includes a motor shaft that is aligned with the shaft and an axis of the at least one rolling member,*

*wherein the motor rotates the shaft and the at least one rolling member connected thereto such that the at least one rolling member moves along an upper surface of the guide rack of the at least one guide member,*

*wherein the shaft, the motor and the at least one rolling member move integrally with the drawer.*

*27. The refrigerator of claim 26, wherein the shaft includes a first end connected to the motor and a second end opposite to the first end.*

*28. The refrigerator of claim 27:*

*wherein the motor includes a stator, a rotor connected to the motor shaft, and a housing configured to protect the rotor and the stator,*

*wherein the at least one rolling member includes a first rolling member, and*

*wherein the motor shaft includes a first motor shaft connected to the shaft and a second motor shaft connected to the first rolling member.*

*29. The refrigerator of claim 28, wherein the first motor shaft protrudes outward from the housing in a first protruding direction and the second motor shaft protrudes outward from the housing in a second protruding direction opposite to the first protruding direction.*

*30. The refrigerator of claim 28, wherein the first motor shaft is inserted in the first end of the shaft.*

*31. The refrigerator of claim 30, further comprising a coupling member configured to couple the first motor shaft and the first end of the shaft.*

*32. The refrigerator of claim 28, wherein the at least one rolling member further includes a second rolling member to which the second end of the shaft is connected.*

*33. The refrigerator of claim 28, wherein the first rolling member includes a pinion having gear teeth that are located on an outer peripheral surface of the pinion, and a connection portion extended from the pinion and connected to the second motor shaft.*

*34. The refrigerator of claim 33, wherein the second motor shaft is inserted in the connection portion of the first rolling member.*

*35. The refrigerator of claim 33, wherein a cross section of each of the first and second motor shafts is non-circular.*

*36. The refrigerator of claim 26, further comprising a bracket configured to connect the motor to the first frame.*

*37. The refrigerator of claim 36, wherein the motor is spaced apart from the first frame in a first direction crossing a longitudinal direction of the first frame.*

*38. The refrigerator of claim 37, wherein the bracket is disposed between the first frame and at least a portion of the motor.*

*39. The refrigerator of claim 37, wherein the first frame includes a fastening mount extended from the first frame in the first direction, and*

*wherein the bracket includes a first part connected to the fastening mount and a second part bent from the first part and connected to the motor.*

*40. The refrigerator of claim 39, further comprising a coupling member configured to couple the fastening mount and the first part in the longitudinal direction of the first frame.*

*41. The refrigerator of claim 39, wherein the first part is disposed between an upper rear end of the drawer and the motor shaft of the motor.*

*42. The refrigerator of claim 39, wherein the second part surrounds at least a portion of the motor shaft of the motor.*

*43. The refrigerator of claim 36, wherein a signal wire and a power wire are connected to the motor.*

*44. The refrigerator of claim 26, wherein the storage box includes an upper rear end and a lower rear end,*

*wherein a distance between the upper rear end of the storage box and the door is greater than a distance between the lower rear end of the storage box and the door, and*

*wherein the shaft is located closer to the upper rear end of the storage box than the lower rear end of the storage box.*

*45. The refrigerator of claim 44, wherein a distance between the shaft and the door is greater than the distance between the upper rear end of the storage box and the door.*

*46. The refrigerator of claim 44, wherein the upper rear end of the drawer is positioned higher than the shaft.*

*47. The refrigerator of claim 26, further comprising a rail assembly positioned to correspond to the first and second frames to allow the storage box to be inserted into and withdrawn from the at least one compartment,*

*wherein the rail assembly, the first and second frames and the at least one rolling member are positioned higher than the guide rack.*

*48. The refrigerator of claim 47, wherein the at least one rolling member moves forward and rearward based on the at least one rolling member interacting with gear teeth provided on the upper surface of the guide rack.*

*49. The refrigerator of claim 47, wherein the motor shaft is positioned higher than the guide rack and lower than an upper surface of the first frame.*

*50. The refrigerator of claim 47, wherein the at least one guide member includes a rail mounting recess configured to receive the rail assembly, and*

*wherein the guide rack extends from a bottom of the rail mounting recess in a horizontal direction.*

*51. The refrigerator of claim 26, further comprising an additional door provided at an upper side of the door, and an input button provided on a front side of the additional door to input a command for withdrawing or inserting the storage box.*

*52. The refrigerator of claim 26, wherein the motor rotates the at least one rolling member such that the at least one rolling member moves rearward in the at least one compartment along the upper surface of the guide rack based on a determination that an external force is applied to the door in a state in which the storage box is withdrawn from the at least one compartment.*

* * * * *